United States Patent
Rapp (10) Patent No.: US 8,635,501 B2
(45) Date of Patent: Jan. 21, 2014

(54) DETECTING MEMORY HAZARDS IN PARALLEL COMPUTING

(75) Inventor: John Lee Rapp, San Diego, CA (US)

(73) Assignee: Microsoft Corporation, Redmond, WA (US)

(*) Notice: Subject to any disclaimer, the term of this patent is extended or adjusted under 35 U.S.C. 154(b) by 360 days.

(21) Appl. No.: 13/190,074

(22) Filed: Jul. 25, 2011

(65) Prior Publication Data

US 2013/0031428 A1 Jan. 31, 2013

(51) Int. Cl.
*G06F 11/00* (2006.01)
(52) U.S. Cl.
USPC .......................................................... 714/48
(58) Field of Classification Search
USPC .............. 714/37, 38.1, 39, 45, 46, 47.1, 47.2, 714/47.3, 48
See application file for complete search history.

(56) References Cited

U.S. PATENT DOCUMENTS

| | | | |
|---|---|---|---|
| 6,209,126 B1 * | 3/2001 | Sasaki et al. | 717/125 |
| 6,470,445 B1 * | 10/2002 | Arnold et al. | 712/218 |
| 6,584,436 B2 | 6/2003 | Hellestrand | |
| 6,651,164 B1 * | 11/2003 | Soltis et al. | 712/217 |
| 6,711,670 B1 * | 3/2004 | Soltis et al. | 712/216 |
| 7,343,477 B1 | 3/2008 | Thatipelli | |
| 7,725,697 B2 * | 5/2010 | Kissell | 712/244 |
| 7,730,291 B2 * | 6/2010 | Kissell | 712/244 |
| 7,746,709 B2 | 6/2010 | Joshi | |
| 2005/0076188 A1 * | 4/2005 | Nishikawa et al. | 712/27 |
| 2007/0118726 A1 * | 5/2007 | Abernathy et al. | 712/225 |
| 2010/0050026 A1 | 2/2010 | Okabe | |
| 2010/0122044 A1 * | 5/2010 | Ford et al. | 711/154 |

OTHER PUBLICATIONS

Trace table based approach for pipelined microprocessor verification—Published Date: Jun. 22-25, 1997 http://citeseer.ist.psu.edu/viewdoc/download;jsessionid=F40D050954A5BE0636E69AF364E49DC8?doi=10.1.1.23.8390&rep=rep1&type=pdf.

SHARP: efficient loop scheduling with data hazard reduction on multiple pipeline DSP systems—Published Date: Oct. 30-Nov. 1, 1996 http://ieeexplore.ieee.org/stamp/stamp.jsp?tp=&arnumber=558358.

A data hazard detection method for DSP with heavily compressed instruction set—Published Date: Oct. 18-21, 2004 http://ieeexplore.ieee.org/stamp/stamp.jsp?tp=&arnumber=1435136.

* cited by examiner

*Primary Examiner* — Nadeem Iqbal
(74) *Attorney, Agent, or Firm* — Shook, Hardy & Bacon L.L.P.

(57) ABSTRACT

A computer-implemented method, computer-readable media, and a computerized system to track and detect data hazards are provided. The computerized system includes processors configured to execute instructions associated with a multithreaded program. The computerized system allocates memory for the multithreaded program and creates threads for execution on the processors. The memory may include a reserved area for tracking information. The threads access the allocated memory in accordance with the multithreaded program and the memory including the tracking information is updated based on the threads' memory access. In turn, the processors generate notifications of data hazard based on the tracking information stored in the allocated memory.

20 Claims, 5 Drawing Sheets

DETECTING MEMORY HAZARDS IN PARALLEL COMPUTING

BACKGROUND

Conventionally, parallel processing computers reduce the amount of time required to process instructions of a computer program. In the parallel processing computers, at least two processors simultaneously execute instructions. The conventional parallel processing computers may employ synchronization when executing to ensure proper execution of the computer program. Thus, conventional parallel processing computers are configured to handle race conditions.

For instance, if a consuming thread depends on data from a producing thread, the consuming thread must first wait until the producing thread has written the data in the memory shared by the threads. Similarly, if the consuming thread requires data before the producing thread overwrites the data, the overwrite requested by the producing thread must not occur until the data is read by the consuming thread. Special instructions, included by a developer or compiler, may be utilized by the processors to perform synchronization. The synchronization of the processors executing the threads may reduce the likelihood of these race conditions.

In some conventional parallel processing computers, static code analysis is performed to inform a developer of potential fault or race conditions. The processors parse the code to determine the existence of potential race conditions. The race conditions may include, among others, read-after-write (RAW) data hazards, write-after-write (WAW) data hazards, and write-after-read (WAR) data hazards. In turn, the developer may modify the code by reordering instructions of the computer program. The modified computer program is executed on the processors. During execution of the modified computer program, the processors avoid the previously identified race conditions. Unfortunately, static code analysis alone is unable to prevent race conditions because execution order of the modified computer program may vary during subsequent runs and the static code analysis may notify the user of false positives, e.g., identifying a race condition when one does not exist, or false negatives, e.g., not identifying a race condition when one does exist.

SUMMARY

Embodiments of the invention relate in one regard to parallel processing computers, computer-readable media, and computer-implemented methods that track memory access and identify race conditions based on the access patterns. The parallel processing computer may generate a notification when a race condition is detected using the system described below.

The parallel processing computer is configured to load instructions associated with a program into memory. In turn, the parallel processing computer allocates memory for data utilized by the program. The parallel processing computer may reserve a portion of the allocated memory for tracking access to the memory. At least two threads are created by the parallel processing computer to implement the program and to access the memory. The memory access pattern of the at least two threads are observed and stored by the parallel processing computer. The access patterns may be stored in the protection of the allocated memory reserved for tracking access to the memory. The parallel processing computer may generate the notifications based on the access patterns. The notification generated by the parallel processing computer may identify the instructions that caused the race condition.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the invention are described in detail below with reference to the attached figures, which are incorporated by reference herein and wherein.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

Embodiments of the invention provide a parallel processing computer system configured to identify data hazards during execution of a program. In one embodiment, rather than attempting to perform static code analysis, the parallel processing computer system records and analyzes memory accesses at run-time. This has several benefits. One benefit is that the parallel processing computer system detects data-dependent hazards, i.e., hazards which only occur when specific data is presented. Another benefit is that the parallel processing computer system may be configured to reduce false positives—conditions where a data-dependent hazard is theoretically possible, but due to the data presented there is no actual hazard.

Accordingly, the parallel processing computer system may verify that a program is properly performing synchronization to avoid memory hazard conditions. The parallel processing computer system may track circumstances under which data is accessed, i.e., read and written. Because the parallel processing computer system is aware of the synchronization requirements of the programming, memory accesses are analyzed to determine if any of these requirements are violated.

As one skilled in the art will appreciate, the parallel processing computer system may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, redundant arrays of inexpensive disks (RAID), and other magnetic storage devices. These memory technologies can store data momentarily, temporarily, or permanently.

In yet another embodiment, the parallel processing computer system is configured with processors and memories that are utilized to implement a computer program. The computer program may be a multithreaded programs. The parallel processing computer system loads the computer program into memory and executes the program. During execution, the parallel processing computer system may allocate memory for the computer program and may specify a tracking area. The tracking area may store the access patterns associated with the threads utilized by the parallel processing computer system to implement the computer program.

Figure 1:
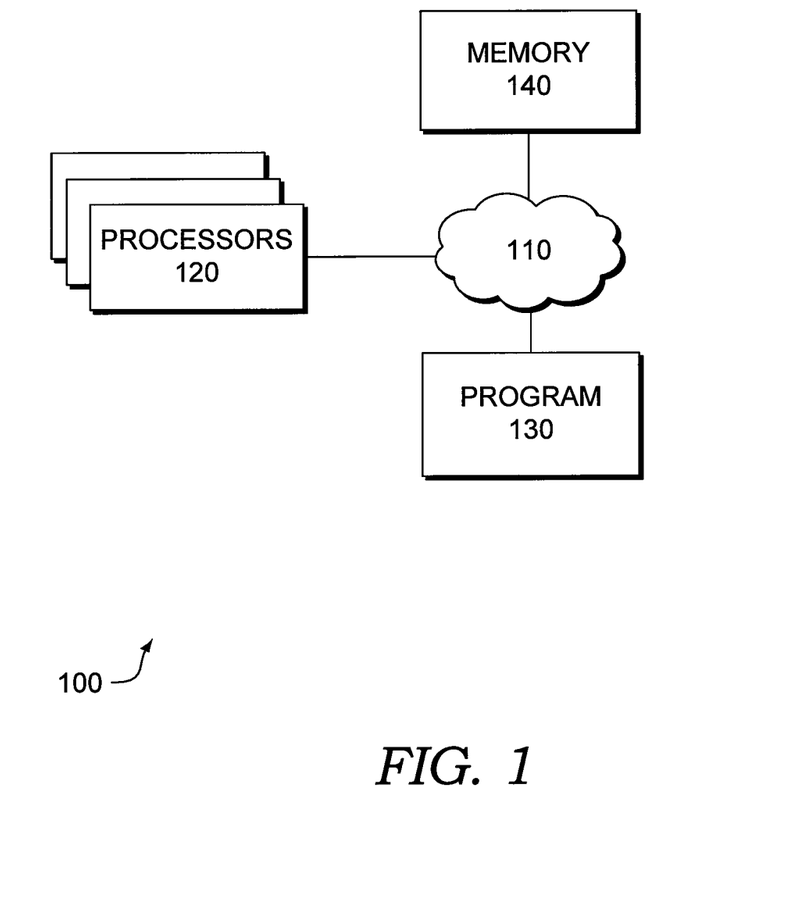
FIG. 1 is a block diagram that illustrates an exemplary parallel processing computer system in accordance with embodiments of the invention.

FIG. 1 is a block diagram that illustrates an exemplary parallel processing computer system in accordance with embodiments of the invention. The parallel processing computer system 100 comprises network 110, processors 120, program 130, and memory 140.

The network 110 connects processors 120 and memory 140. The network 110 is configured to facilitate communication between the processors 120 and the memory 140. The network 110 may be a communication network, such as a bus, wireless network, local area network, wired network, or the Internet. In an embodiment, the processors 120 execute instructions stored in the memory 140.

The processors 120 are connected to the memory 140 via network 110. The processors 120 are utilized by the parallel processing computer system 100 to execute program 130. In turn, the processors may utilize threads to perform tasks specified by the instructions of the program 130. The threads may be created by the processors 120 during execution of the program 130. The processor 120 may analyze access patterns associated with the threads to determine whether a data hazard occurred. In certain embodiments, the processors 120 may generate notifications that identify the data hazard that occurred.

The program 130 may be a multithreaded program. The program 130 includes instructions that are executed by the processors 120. In certain embodiments, the program 130 contains instructions that allow execution on the parallel processing computer system 100. The program 130 may be loaded into memory 140 by the parallel processing computer system 100 and executed by the processors 120.

The memory 140 is configured to store the program 130. In certain embodiments, the memory 140 is allocated in response to the executed program 130. The memory may include an area reserved for program data and an area reserved for tracking memory accesses by the threads that execute the program instructions. The tracking area may be analyzed by the parallel processing computer system 100 to identify race conditions, e.g., RAW, WAW, WAR, etc. In turn, a notification identifying the race condition may be transmitted by the parallel processing computer system 100 to a user.

Accordingly, embodiments of the invention provide a parallel processing computer system that identifies data hazards detected during execution of a program. The parallel processing computer system also informs the user of the data hazards. The above description is but one configuration that may be utilized in accordance with the embodiments of the invention. One of ordinary skill in the art appreciates that other configurations may be utilized with departing for spirit and scope of the described embodiments.

In some embodiments the parallel processing computer system may be part of a computer. The computer may include several components that communicate to process files stored on the computer. The components may include displays and input devices that allow a user to interact with the computer and to receive notifications from the parallel processing computer system.

Figure 2:
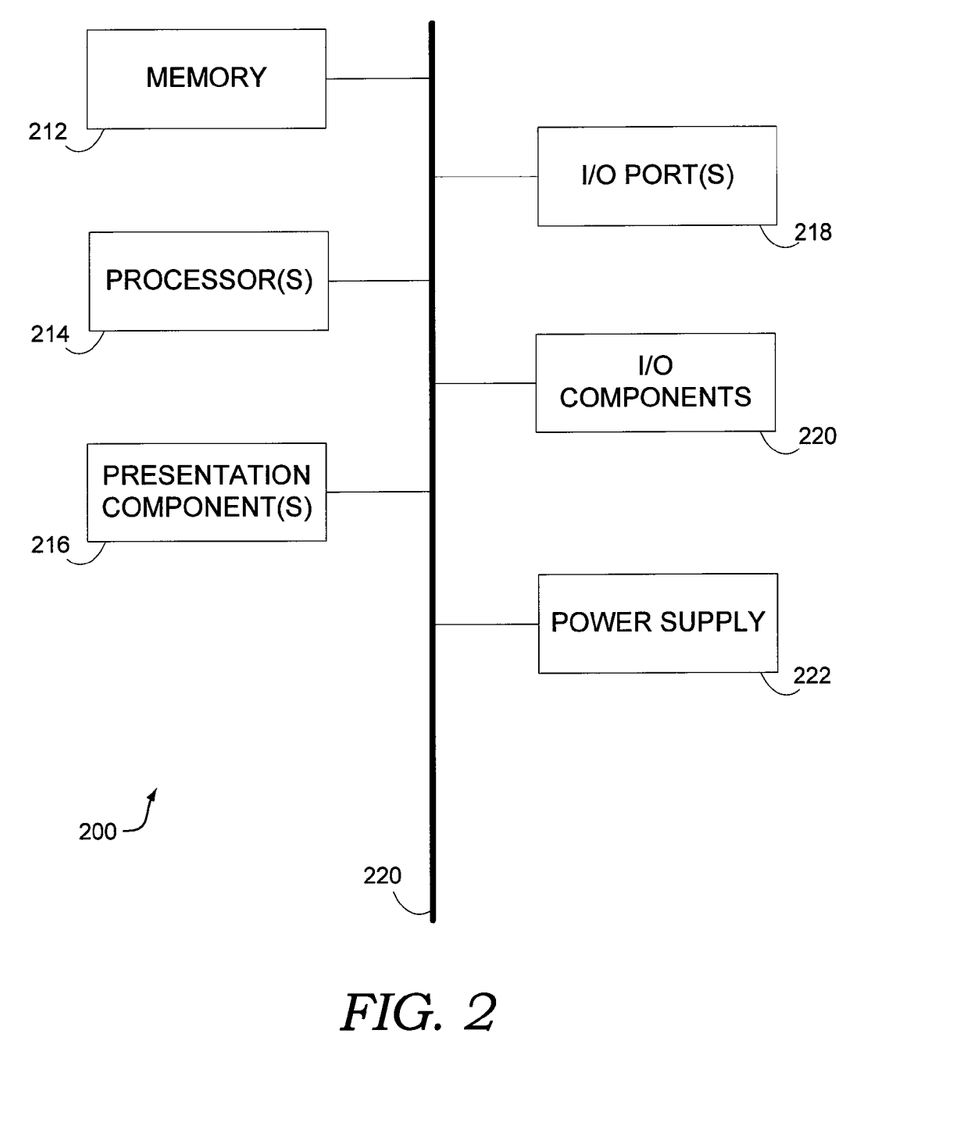
FIG. 2 is a component diagram that illustrates components of the parallel processing computer system in accordance with embodiments of the invention.

FIG. 2 is a component diagram that illustrates components of the parallel processing computer system in accordance with embodiments of the invention.

Referring initially to FIG. 2 in particular, an exemplary operating environment for implementing embodiments of the invention is shown and designated generally as computing device 200. Computing device 200 is but one example of a suitable computing environment and is not intended to suggest any limitation as to the scope of use or functionality of invention embodiments. Neither should the computing environment be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including parallel processing computers, handheld devices, consumer electronics, general-purpose computers, more specialty computing devices, etc. Embodiments of the invention may also be practiced in distributed computing environments where tasks are performed by remote-processing devices that are linked through a communications network.

With reference to FIG. 2, computing device 200 includes a bus 210 that directly or indirectly couples the following devices: memory 212, one or more processors 214, one or more presentation components 216, input/output ports 218, input/output components 220, and an illustrative power supply 222. Bus 210 represents what may be one or more busses (such as an address bus, data bus, or combination thereof). Although the various blocks of FIG. 2 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 2 is merely illustrative of an exemplary computing device that can be used in connection with one or more embodiments of the invention. Distinction is not made between such categories as "workstation," "server," "laptop," "handheld device," etc., as all are contemplated within the scope of FIG. 2 and reference to "computing device."

Computing device 200 typically includes a variety of computer-readable media. By way of example, and not limitation, computer-readable media may comprise computer storage media and communication media. Computer-readable media include random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices. Communication media include carrier waves or any other media that can be used to encode desired information and be accessed by computing device 200.

Memory 212 includes computer-storage media in the form of volatile and/or nonvolatile memory. The memory may be removable, nonremovable, or a combination thereof. Exemplary hardware devices include solid-state memory, hard drives, optical-disc drives, etc. Computing device 200 includes one or more processors that read data from various entities such as memory 212 or I/O components 220. Presentation component(s) 216 present data indications to a user or other device. Exemplary presentation components 216 include a display device, speaker, printing component, vibrating component, etc. The I/O components 220 may include keyboards, microphones, touch screens, pointers, joysticks, etc. The I/O components allow a user to interact with the computing device 200 to specify data hazards that the user is interested in.

In some embodiments, the parallel processing computer system is a single instruction multiple data (SIMD) system configured to track, in realtime, the access patterns of threads that implement a computer program. The parallel processing computer system analyzes a tracking area associated with the threads to determine whether a data hazard has occurred during execution of the computer program.

Figure 3:
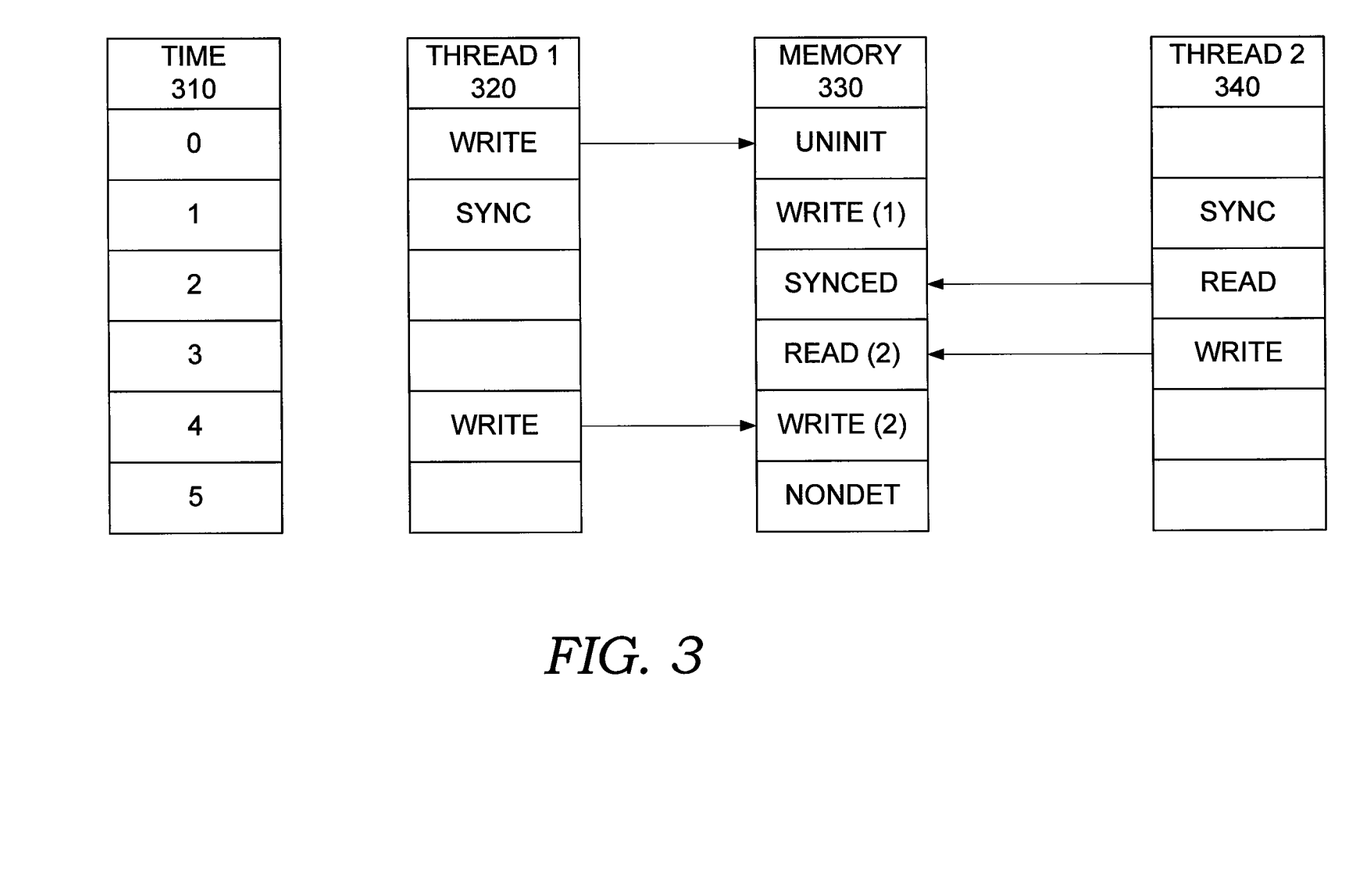
FIG. 3 is a timing diagram that illustrates memory access patterns of at least two threads employed by the parallel processing computer system in accordance with embodiments of the invention.

FIG. 3 is a timing diagram that illustrates memory access patterns of at least two threads employed by the parallel processing computer system in accordance with embodiments of the invention. For instance, the parallel processing computer system may execute a program via at least two threads. The parallel processing system may track, time 310, thread 1 320, memory 330, and thread 2 340. An exemplary flow during execution of a computer program may include the following. When time 310 is time 0, memory 330 may be in the uninitialized state. Also, at time 0, thread 1 320 may write to memory 330. Writing to memory 330 that is in an uninitialized state is allowed by the parallel processing computer system but reading from memory 330 that is in an uninitialized state may create a data hazard. Reading from memory 330 that is in an uninitialized state may be disallowed by the parallel processing computer system in certain embodiments. In turn, the parallel processing computer system may store the content of the write command in memory 330. Also, the parallel processing computer system may update a tracking area of memory 330 to indicate that a write command was received from thread 1 320.

When time 310 is time 1, both threads may reach a synchronization barrier. Here, thread 1 and thread 2 may synchronize before issuing additional commands to memory 330. In turn, the parallel processing computer system may update the tracking area of memory 330 to indicate that a synch command was received from thread 1 and/or thread 2.

When time 310 is time 2, thread 2 may read from memory 330. Reading from memory 330 that is in a synchronized state is allowed by the parallel processing computer system. So, the parallel processing computer system may update the tracking area of memory 330 to indicate that a read command was received from thread 2.

Later, when time 310 is time 3, thread 2 may write to memory 330. Writing to memory 330 that was read by the same is currently writing to memory 330 is allowed by the parallel processing computer system. But if the thread writing to memory 330 is different from the thread that read from memory 330, the parallel processing computer system, in one embodiment, may disallow the thread writing to memory 330. Because the write is allowed, the parallel processing computer system may update the tracking area of memory 330 to indicate that a write command was received from thread 2.

Shortly thereafter or simultaneously, when time 310 is time 4, thread 1 may also write to memory 330. The parallel processing computer system may update the tracking area of memory 330 to indicate that the state of the memory is non-deterministic because a potential data hazard condition (WAW) now exists. Here, two different threads have written to the same memory 330. Memory 330 may be written to by thread 1 after thread 1 wrote to it. The parallel processing computer system allows successive writes by the same threads not different threads. Accordingly, in some embodiments, the tracking area of memory 330 identifies a WAW data hazard.

In certain embodiments, the parallel processing computer system may include a virtual machine that utilizes thread groups to access shared resources, including group memory. The virtual machine may reserve a tracking area to log access to the group memory. Accordingly, the virtual machine may generate notifications of data hazards that are identified in the access logs.

Figure 4:
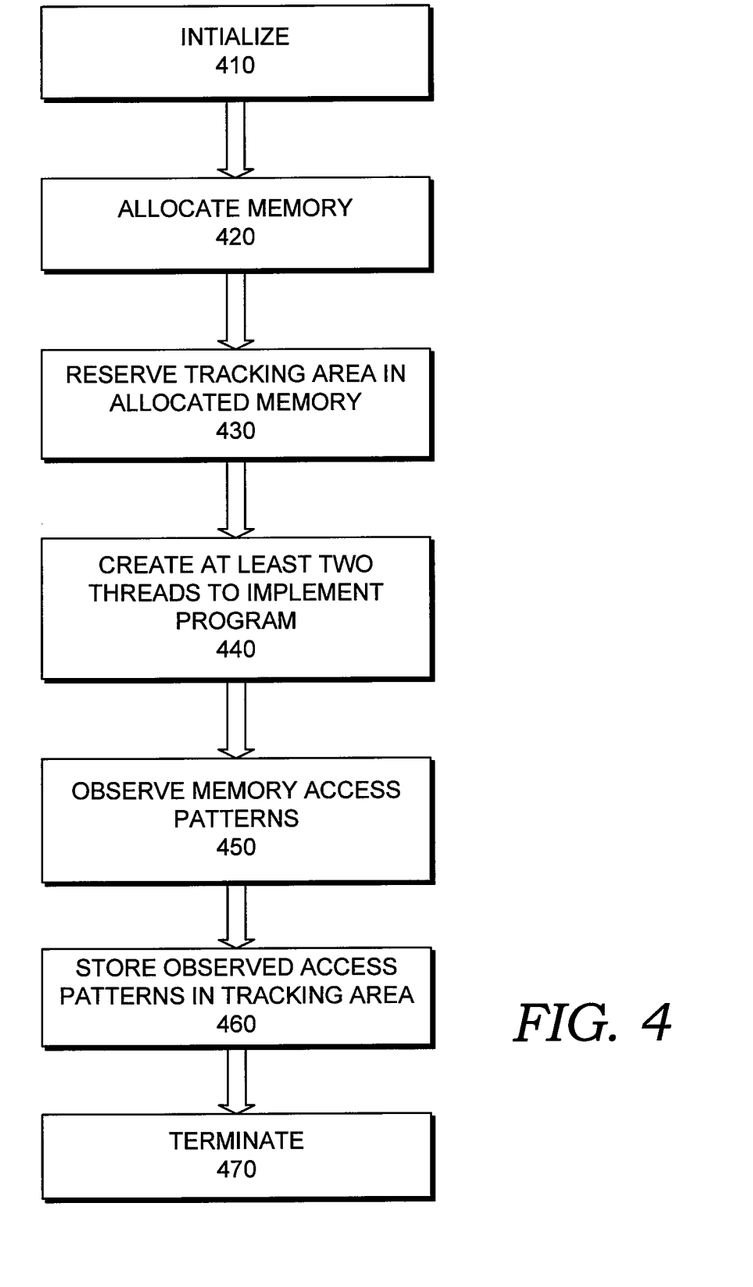
FIG. 4 is a logic diagram that illustrates a method to detect data hazards in accordance with embodiments of the invention.

FIG. 4 is a logic diagram that illustrates a method to detect data hazards in accordance with embodiments of the invention. A parallel processing computer system executing a multithreaded program may track data hazard by execution following steps. The method initialized in step 410. In step 420, the parallel processing computer system allocates memory for data utilized by the multithreaded program. A portion of the allocated memory is reserved for tracking access to the memory by parallel processing computer system, in step 430. In certain embodiments, the portion reserved for tracking is interleaved with memory for storing data utilized by the multithreaded program.

In step 440, the parallel processing computer system creates at least two threads to implement the multithreaded program and to access the memory. The parallel processing computer system observes memory access patterns by the at least two threads, in step 450. In some embodiments, the parallel processing computer system may generate a notification when a data hazard is detected. The data hazards identified by the parallel processing computer may include any of the following: write-after-write data hazard; read-after-write data hazard; write-after-read data hazard; reading uninitialized memory; two or more simultaneous atomic operations on data stored in allocated memory, etc. The two or more simultaneous atomic operations may generate a data hazard when the operations being performed on the data are different. For instance, one thread performing an add operation when another thread is performing a bitwise-xor operation. The memory location will be nondeterministic because the resulting value could be either: the result of the add operation followed by the bitwise-xor operation or the result of the bitwise-xor operation followed by the add operation. In some embodiments, the parallel processing computer system may allow one or more data hazards when the value stored in memory remains the same. For instance, a write by both threads that contains the same value may be allowed by the parallel processing computer system.

The notifications may include the data hazard and the segment of the multithreaded program that corresponds to the data hazard. A user may request notification for specific data hazards, e.g. WAR-only notifications, WAW-only notifications, etc. The notifications requested by the user are transmitted by the parallel processing computer system to the computing device utilized by the user. In turn, the parallel processing computer system, in step 460, may store the access patterns in the reserved portion of the allocated memory. The method terminates in step 470.

In still other embodiments, the parallel processing computer system may include a virtual machine that utilizes a state machine to manage access to shared resources by thread groups. The state machine may specify the appropriate access patterns that available based on the current input and state of the virtual machine. Accordingly, the virtual machine may generate notifications of data hazards that are identified by the state machine.

Figure 5:
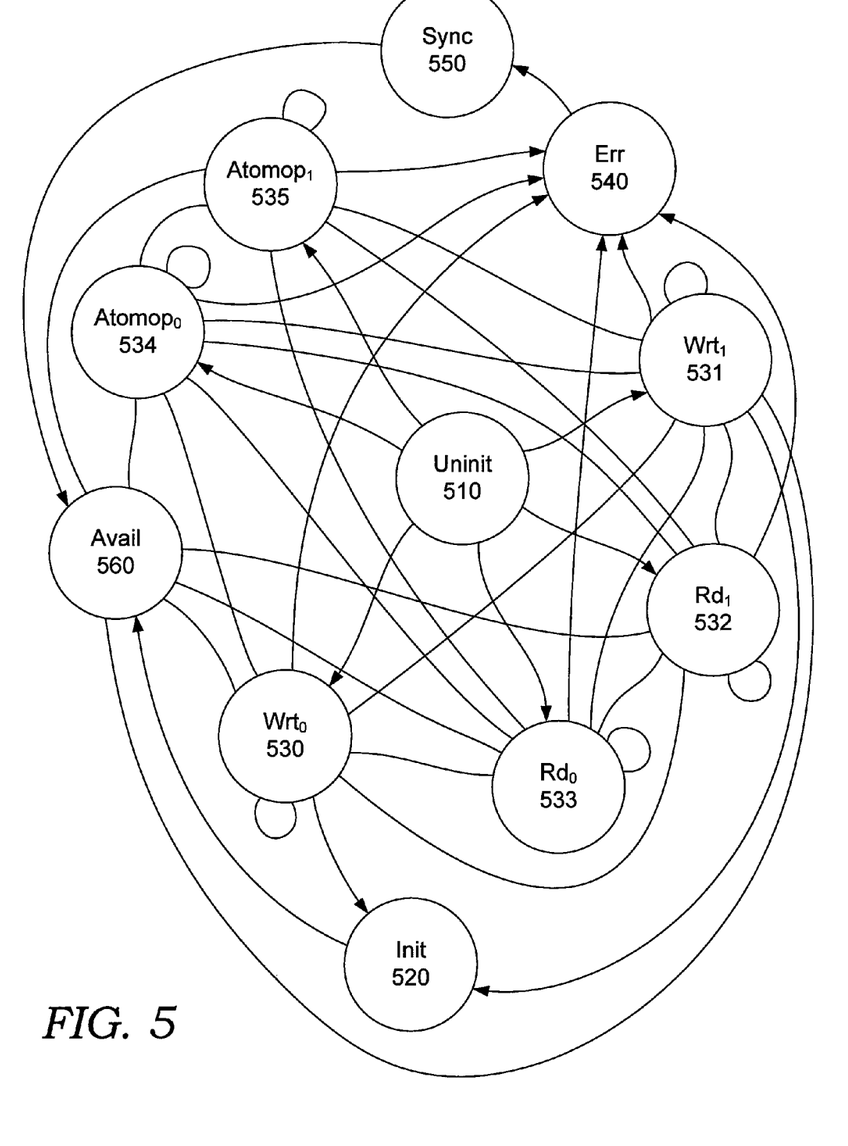
FIG. 5 is a state machines that illustrates transitions between various memory states in accordance with embodiments of the invention.

FIG. 5 is a state machines that illustrates transitions between various memory states in accordance with embodiments of the invention. The state machine includes states 510-560, which are transitioned among based on the current input and state of the machine. The state machine may transition from an uninitialized state 510, initialized state 520, action states 531-535, error state 540, synchronization state 550, and available state 560.

Initially, the state machine may be in the uninitialized state 510. Here, the state machine may receive a request to read by thread 0 533, or to read by thread 1 532. Here, the state machine may transition to the error state 540 as this is a data hazard. The state machine is configured to prevent thread 0 or thread 1 from reading uninitialized memory. In the error state 540, a notification may be generated for the user. In turn, the state machine transitions to back to uninitialized state 510.

The initialized state 520 is transitioned to from either thread 0 or thread 1 writing to uninitialized memory. The state machine transitions from uninitialized state 510 to either write by thread 0 530 or write by thread 1 531. From states 530 or 531, the state machine may transition to initialized state 520 after thread 0 or thread 1 writes to the uninitialized memory. In the initialized state 520, the memory is now available for further action by the thread 0 or thread 1. The state machine transitions from the initialized state 520 to available state 560 where the state machine waits for actions requested to be performed on the initialized memory by the threads. In turn, the state machine transitions from the available state, to an action state 531-535 associated with the input received from a thread. If thread 0 requests any of a write, read, or atomic operation, the state machine may transition from available state 560 to 530, 533, 534, respectively. If thread 1 requests a write, read, or atomic operation, the state machine may transition from available state 560 to 531, 532, 535 respectively.

The action states 531-535 may be transitioned to from any other actions state 531-535 or from the available state 560. The state machine transitions from available state 560 to write by thread 0 530, write by thread 1 531, read by thread 1 532, read by thread 0 533, atomic operation by thread 0 534, or atomic operation by thread 1 535. Depending on the action that is received during or after the transition to the appropriate action state, the state machine may transition to the error state and generate an error message. The state machine may transition to the error state 540 based on a function of the prior or current state and the current input. If the current state is uninitialized state 510 and the current input, e.g., read request by thread 1, causes the state machine to move to: read by thread 1 532, read by thread 0 533, atomic operation by thread 0 534, or atomic operation by thread 1 535, the state machine may transition to the error state 540.

If the current state is read by thread 1 532 and the current input causes the state machine to move to: write by thread 0 530 or atomic operation by thread 0 534, the state machine may transition to the error state 540. However, in some embodiments, the state machine checks to determine whether the result of the operation performed by the current input changes the value stored in memory. If no change occurs, the state machine does not transition to error state 540. Instead, the state machine transitions to write by thread 0 530 or atomic operation by thread 0 534 depending on the operation associated with current input. If a change occurs, the state machine transitions to error state 540. If the current state is read by thread 1 532 and the current input is not a write or atomic operation by thread 0, the state machine transitions to the action state corresponding to the current input and the error state is avoided.

If the current state is write or atomic operation by thread 1 531 or 535 and the current input causes the state machine to move to: write by thread 0 530, read by thread 0 533, or atomic operation by thread 0 534, the state machine may transition to the error state 540. However, in some embodiments, the state machine checks to determine whether the result of the operation performed by the current input changes the value stored in memory. If no change occurs, the state machine does not transition to error state 540. Instead, the state machine transitions to write by thread 0 530, read by thread 0 533, or atomic operation by thread 0 534 depending on the operation associated with current input. If a change occurs, the state machine transitions to error state 540. If the current state is write or atomic operation by thread 1 531 or 535 and the current input is not a write, read, or atomic operation by thread 0, the state machine transitions to the action state corresponding to the current input and the error state is avoided.

A similar state machine flow applies to requests from thread 0. If the current state is read by thread 0 533 and the current input causes the state machine to move to: write by thread 1 530 or atomic operation by thread 1 535, the state machine may transition to the error state 540. However, in some embodiments, the state machine checks to determine whether the result of the operation performed by the current input changes the value stored in memory. If no change occurs, the state machine does not transition to error state 540. Instead, the state machine transitions to write by thread 1 530 or atomic operation by thread 1 535 depending on the operation associated with current input. If a change occurs, the state machine transitions to error state 540. If the current state is read by thread 0 533 and the current input is not a write or atomic operation by thread 1, the state machine transitions to the action state corresponding to the current input and the error state is avoided. If the current state is write or atomic operation by thread 0 530 or 534 and the current input causes the state machine to move to: write by thread 1 531, read by thread 1 532, or atomic operation by thread 1 535, the state machine may transition to the error state 540. However, in some embodiments, the state machine checks to determine whether the result of the operation performed by the current input changes the value stored in memory. If no change occurs, the state machine does not transition to error state 540. Instead, the state machine transitions to write by thread 1 531, read by thread 1 532, or atomic operation by thread 1 535 depending on the operation associated with current input. If a change occurs, the state machine transitions to error state 540. If the current state is write or atomic operation by thread 0 531 or 535 and the current input is not a write, read, or atomic operation by thread 1, the state machine transitions to the action state corresponding to the current input and the error state is avoided.

The error state 540 allows the state machine to trigger a notification of the error that occurred. In turn, state machine transitions from the error state to the synchronization state 550, where the system synchronizes data. From synchronization state 550, the state machine transitions to available state 560 and waits for an input for the thread 0 or thread 1.

In another embodiment, the parallel processing computer system may operate in accordance with the following state table. The sate table, like the state machine, provides a summary of the error conditions and potential states that the parallel processing computer system may operate in. In the table, each column header represents a current state of the parallel processing computer system, each row header represents the current input or action, and the cell values represent the state transitions of the parallel processing computer system.

| | | | State | | | | | | |
|---|---|---|---|---|---|---|---|---|---|
| Input | Uninitialized | Available to All Threads | Write available only to thread 0, but read is available to any thread | Write unavailable | Read-write available only to thread 0 | Available only for atomic operation A or thread 0 | Available only for atomic operation A | Error state |
| Write thread 0 | Read-write available only to thread 0 | Read-write available only to thread 0 | Read-write available only to thread 0 | Error state | Read-write available only to thread 0 | Read-write available only to thread 0 | Error state | Error state |
| Write other thread | (other thread is now thread 0 for the purpose of this table) | (other thread is now thread 0 for the purpose of this table) | Error state (WAR) | Error state (WAR) | Error state (WAW) | Error state (atomic) | Error state (atomic) | Error state |
| Read thread 0 | Error state (uninit) | Write available only to thread 0, but read is available to any thread | Write available only to thread 0, but read is available to any thread | Write unavailable | Read-write available only to thread 0 | Read-write available only to thread 0 | Error state (atomic) | Error state |
| Read other thread | Error state (uninit) | (other thread is now thread 0 for the purpose of this table) | Write unavailable | Write unavailable | Error state (RAW) | Error state (atomic) | Error state (atomic) | Error state |
| Write same value thread 0 | Read-write available only to thread 0 | Write available only to thread 0, but read is available to any thread | Write available only to thread 0, but read is available to any thread | Write unavailable | Read-write available only to thread 0 | Read-write available only to thread 0 | Error state (atomic) | Error state |
| Write same value other thread | (other thread is now thread 0 for the purpose of this table) | (other thread is now thread 0 for the purpose of this table) | Write unavailable | Write unavailable | Error state (WAW) | Error state (atomic) | Error state (atomic) | Error state |
| Atomic operation A by thread 0 | Error state (uninit) | Available only for atomic operation A or thread 0 | Read-write available only to thread 0 | Error state (atomic) | Read-write available only to thread 0 | Available only for atomic operation A or thread 0 | Available only for atomic operation A | Error state |
| Atomic operation A by other thread | Error state | (other thread is now thread 0 for the purpose of this table) | Error state (atomic) | Error state (atomic) | Error state (atomic) | Available only for atomic operation A | Available only for atomic operation A | Error state |

-continued

| Input | Uninitialized | Available to All Threads | Write available only to thread 0, but read is available to any thread | Write unavailable | Read-write available only to thread 0 | Available only for atomic operation A or thread 0 | Available only for atomic operation A | Error state |
|---|---|---|---|---|---|---|---|---|
| Atomic operation B by thread 0 | Error state (uninit) | (Atomic B is now Atomic A for the purpose of this table) | Read-write available only to thread 0 | Error state (atomic) | Read-write available only to thread 0 | Read-write available only to thread 0 | Error state (atomic) | Error state |
| Atomic operation B by other thread | Error state | (other thread is now thread 0 for the purpose of this table) | Error state (atomic) | Error state (atomic) | Error state (atomic) | Error state (atomic) | Error state (atomic) | Error state |
| Sync | Uninitialized | Available to All Threads | Available to All Threads | Available to All Threads | Available to All Threads | Available to All Threads | Available to All Threads | Available to All Threads |

In summary, a parallel processing computer system may be configured to detect race conditions while executing a computer programs. Also, the parallel processing computer system may generate warning messages, in realtime, to inform a user of the detected data hazards. The warning message may include positions within the computer programs that correspond to the detected hazards. Thus, if a computer program does not finish, the warning message may inform the user of a potential reason that computer program failed to completely execute. In one embodiments, a user may filter data hazards received at the computing device by specifying the data hazards that a user wishes to receives notifications concerning.

The foregoing descriptions of the embodiments of the invention are illustrative, and modifications in configuration and implementation are within the scope of the current description. For instance, while the embodiments of the invention are generally described with relation to illustrated figures, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

I claim:

1. A computer-implemented method for tracking data hazards in a parallel processing system executing a multithreaded program, the method comprising:
   allocating memory for data utilized by the multithreaded program;
   reserving a portion of the allocated memory for tracking access to the memory;
   creating one or more threads to implement the multithreaded program and to access the memory;
   observing memory access patterns by the one or more threads; and
   storing the access patterns in the reserved portion of the allocated memory.

2. The computer-implemented method of claim 1, further comprising:
   generating a notification when a data hazard is detected.

3. The computer-implemented method of claim 2, wherein the notification includes the data hazard and the segment of the multithreaded program that corresponds to the data hazard.

4. The computer-implemented method of claim 2, wherein a user requests notification for specific data hazards.

5. The computer-implemented method of claim 4, further comprising:
   transmitting the notification to the user.

6. The computer-implemented method of claim 1, wherein the portion reserved for tracking is interleaved with memory for storing data utilized by the multithreaded program.

7. The computer-implemented method of claim 1, further comprising:
   identifying one or more data hazards based on the access patterns.

8. The computer-implemented method of claim 7, wherein the one or more data hazards is a write-after-write hazard.

9. The computer-implemented method of claim 7, wherein the one or more data hazards is a read-after-write hazard.

10. The computer-implemented method of claim 7, wherein the one or more data hazards is a write-after-read hazard.

11. The computer-implemented method of claim 7, wherein the one or more data hazards is reading uninitialized memory.

12. The computer-implemented method of claim 7, wherein the one or more data hazard is two or more simultaneous atomic operations on data stored in allocated memory.

13. The computer-implemented method of claim 7, further comprising:
   allowing one or more data hazards when the value stored in memory remains the same.

14. The computer-implemented method of claim 13, wherein a write by both threads that contains the same value is allowed.

15. A computer configured perform realtime detection of data hazards in an program executing on the computer, the computer comprising:
   one or more memories allocated by the computer to store program data and tracking information associated with program; and
   one or more processors configured to execute instructions associated with the program and to generate notifications of data hazard based on the tracking information, wherein the instructions are executed by at least two threads that access the program data and update the tracking information to reflect the operation performed on the program data.

16. The media of claim 15, wherein certain notification are transmitted to a user of the computer.

17. One or more computer readable storage media storing computer-useable instructions for performing a computer-implemented method for tracking data hazards in a multiprocessing system executing a multithreaded program, the method comprising:
   allocating memory for data utilized by the multithreaded program;
   reserving a portion of the allocated memory for tracking access to the memory;
   creating at least two threads to implement the multithreaded program and to access the memory;
   observing memory access patterns by the at least two threads; and
   storing the access patterns in the reserved portion of the allocated memory.

18. The media of claim 17, further comprising:
   generating a notification when a data hazard is detected.

19. The media of claim 18, wherein the notification includes the data hazard and the segment of the multithreaded program that corresponds to the data hazard.

20. The media of claim 19, wherein a user requests notification for specific data hazards.

* * * * *